Patented Aug. 26, 1941

2,254,051

UNITED STATES PATENT OFFICE 2,254,051

CEANOTHUS AMERICANUS EXTRACT

Guy C. Taylor, Decatur, Ill., assignor to Flint, Eaton & Company, Decatur, Ill., a corporation of Illinois No Drawing. Application November 15, 1937, Serial No. 174,665

6 Claims. (Cl. 260—236.5)

This invention relates to compositions of matter for therapeutical uses, and the manufacture thereof, and with regard to certain more specific features to compositions of matter derived from the drug Ceanothus americanus.

Among the several objects of the invention may be noted the provision of new compositions of matter derived from the drug Ceanothus americanus, which compositions of matter are believed to embody, in a concentrated form, the blood-coagulating properties of the drug; and the provision of processes for preparing such compositions of matter from the drug Ceanothus americanus. Other objects will be in part obvious and in part pointed out hereinafter.

The invention accordingly comprises the elements and combinations of elements, steps and sequence of steps, and features of composition and synthesis, which will be exemplified in the products and processes hereinafter described, and the scope of the application of which will be indicated in the following claims.

It has long been known that the drug comprising the powdered root bark of the plant Ceanothus americanus (otherwise variously referred to as Jersey tea, New Jersey tea, red shank, red root, Walpole tea, or wild snowball), is particularly effective as an agent for increasing the coagulability of blood, both human and animal. The drug has been used to effect a very material reduction in the time of clotting of blood, and thus is of use in all hemmorhagic cases.

In an article in the American Journal of Pharmacy, volume 98, for March 1926, Mr. A. H. Clark reports the conclusions of a great deal of research work done upon the drug mentioned, and concludes that the drug includes certain alkaloids which he claims, at least in part, to have isolated. In my own article in the same journal in volume 99, for April, 1927, I discuss at considerable length the drug and the proposed alkaloids therein as referred to in the said Clark publication. Other publications have attributed the blood-coagulating effect of the drug to these possible alkaloids.

Further research has cast some doubt upon the conclusions expressed in these publications, to the extent that they attribute the blood-coagulating effect of the drug to the alkaloids apparently isolated by Clark. My present work has indicated, on the contrary, that the blood-coagulating effect is more likely to be found to exist in a certain substance which I have succeeded in deriving from the drug mentioned. This substance may or may not be related to or derived from the proposed alkaloids, but, in any event, it is not alkaloidal itself. I will hereinafter describe in detail the method by which said substance is procured, and its properties, so far as I have been able to determine them.

According to the present invention, this new substance is extracted from the drug in the following manner:

Approximately 50 grams of the powdered drug, which comprises the root bark of the plant Ceanothus americanus, is macerated with about 40 grams of concentrated hydrochloric acid, and the mixture is allowed to stand for eight to twelve hours. The wet mixture is then packed into the thimble of a 300 cc. capacity Soxhlet extraction apparatus, and the thimble is inserted into the apparatus in the usual manner.

Ethyl ether, in an amount of the order of 250 cc., is then added through the condenser of the apparatus directly to the drug. The extraction is then commenced, and is continued for about four hours, more or less, under atmospheric pressure and at the boiling temperature of the ether. The particular temperature employed is not important, as the system itself provides that excessive temperatures cannot result.

At the termination of the four-hour extraction period, there is obtained an ether extract of an amber color. The extract is then withdrawn from the extraction apparatus and placed in the flask of a refluxing apparatus.

Refluxing is then carried on at a relatively low heat, such as to allow ether fumes to escape. After most of the ether has been driven off, the flask commences to fill with white fumes. This usually takes place as the temperature of the contents of the flask reaches 125° to 127° C. From this point on, there is considerable sputtering of the residue in the flask, and the bursting bubbles deposit a yellowish crystalline material on the walls of the flask. Refluxing is continued, however, until the temperature of the contents of the flask reaches the order of 160° C.

The flask is then disconnected from the reflux condenser, and is cooled, and the contents of the flask are washed out with acetone. The acetone appears to dissolve all the residue except the yellowish crystals. The acetone wash is then filtered to collect, in the filter, the aforesaid yellowish crystals. The crystals are then washed free from acetone with petroleum ether, and are then dried.

These yellowish crystals constitute the principal product of the present invention. They vary in size and shape, these characteristics apparently depending upon the amount of moisture present during the crystal formation. Generally they appear to be small and rod-shaped. Individually examined they appear to be colorless, but when a large number of crystals are examined in an aggregate under a microscope, they present a yellow to amber appearance. The crystals are substantially insoluble in ethyl ether, chloroform, acetone, petroleum ether, and water. They dissolve easily in cold concentrated hydrochloric acid, or in dilute hydrochloric acid with the aid of heat, apparently forming a hydrochloride complex in so doing. This hydrochloride complex may be crystallized from the hydrochloric acid solution in the usual manner, and it is freely soluble in water. The crystals may be reprecipitated from the hydrochloric acid solution by adding sodium or ammonium hydroxide thereto.

Attempts to determine the melting point of the crystals, and of the hydrochloride complex thereof, have indicated that either the melting points of both are very high, or that both undergo decomposition before melting.

The chemical constitution of the crystals has not as yet been determined, although work is being done at present towards such determination. An indication that the constitution includes iron is obtained from the fact that an aqueous solution of the hydrochloride complex, treated with ammonium thiocyanate, gives a red color.

The therapeutic action of the crystals has not yet been thoroughly gone into, but results have already been obtained which indicate that the crystals are, or at least embody, the active blood-coagulating principle of the drug Ceanothus americanus. For example, a 5 mg. portion of the hydrochloride crystals, injected intravenously in the form of an aqueous solution into a dog, shortens the clotting time of the dog's blood between 50 and 70 per cent.

By a slight modification of technique in the method hereinbefore described, a different product may be obtained, which product is apparently constitutionally related to the yellowish crystalline product hereinbefore described.

For example, after the completion of the extraction step above described, the amber-colored ether extract is removed from the extraction flask and placed in the bulb of a retort. Heat is then carefully applied to the retort, so that distillation goes on slowly. The distillate, which is principally ether, is collected in a dish. The heating is continued until practically all the ether is removed and only a dark residue remains. About the time that the temperature reaches 125° C., white fumes begin to form in the retort and white crystals begin to come over with the distillate. The temperature is finally brought to the order of 150° to 160° C., the distilled white crystals being meanwhile collected in the same dish with the ether distillate.

The dish containing the ether distillate and white crystals is then placed in a current of air to evaporate off the ether, and is left there until the crystal residue in the dish is apparently dry. The drying is then continued in a vacuum until final traces of moisture are removed, and finally the crystals are dried for two hours in a desiccator over calcium chloride.

The resultant white crystals are small, transparent, slender needle shapes. In contrast to the hereinbefore-mentioned yellowish crystals, they are completely soluble in water, but are still only very slightly soluble in alcohol, ethyl ether, acetone and chloroform. Recrystallized from water, these white crystals are much larger, with blunt pointed ends. These white crystals have a well-defined melting point at 99° C.

It is not doubted that these white crystals are somehow constitutionally related to the aforementioned yellow crystals. Since the per cent. yield of the white crystals is greater, considerably, than the per cent. yield of the yellow crystals, it is quite likely that the white crystals will serve as a valuable intermediate for the laboratory preparation of the yellow crystals.

Furthermore, it is probable that the white crystals themselves have certain valuable pharmacological activity, although this does not appear to reside in the decrease of blood clotting time. Repeated intravenous injections of the aqueous solution of the white crystals into dogs has led to no noticeable reductions of the blood clotting times of the dogs.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

I claim:

1. A composition of matter comprising yellowish crystals having a high melting point and being relatively insoluble in ethyl ether, chloroform, acetone, petroleum ether, and water, but soluble in hydrochloric acid, said crystals being obtainable by macerating the drug Ceanothus americanus with hydrochloric acid, extracting the macerated drug with ethyl ether, and then removing the ether from the extract and heating the residue to temperatures up to about 160° C. in such manner that the residue spatters and in so doing deposits said yellowish crystals on the walls of the container.

2. The hydrochloride complex of the substance set forth in claim 1, being itself of crystalline form and freely soluble in water.

3. The method which comprises macerating the drug Ceanothus americanus with hydrochloric acid, extracting the macerated drug with ethyl ether, refluxing the ether extract thus obtained in such manner as to permit the ether to escape, continuing the refluxing at temperatures from about 125° C. to about 160° C., thereby causing the residue of the extract to spatter and in so doing to deposit the product desired.

4. The method which comprises macerating the drug Ceanothus americanus with hydrochloric acid, extracting the macerated drum with ethyl ether, refluxing the ether extract thus obtained in such manner as to permit the ether to escape, continuing the refluxing at temperatures from about 125° C. to about 160° C., thereby causing the residue of the extract to spatter and in so doing to deposit the product desired, and thereafter washing the desired product with acetone to free said product of impurities.

5. The method which comprises macerating about 50 grams of the comminuted drug Ceanothus Americanus with about 40 grams of concentrated hydrochloric acid for about 8 to 12 hours, extracting the macerated drug, still wet with hydrochloric acid, with about 250 cc. of ethyl ether for about 4 hours, refluxing the resulting extract in such manner as slowly to drive off the ether, and continuing the refluxing slowly at temperatures from about 125° C. to about 160° C., thereby causing the residue of the extract to fume and sputter, the sputtering causing the deposition of the desired product in crystalline form.

6. The method which comprises macerating about 50 grams of the comminuted drug *Ceanothus americanus* with about 40 grams of concentrated hydrochloric acid for about 8 to 12 hours, extracting the macerated drug, still wet with hydrochloric acid, with about 250 cc. of ethyl ether for about 4 hours, refluxing the resulting extract in such manner as slowly to drive off the ether, and continuing the refluxing slowly at temperatures from about 125° C. to about 160° C., thereby causing the residue of the extract to fume and sputter, the sputtering causing the deposition of the desired product in crystalline form, and then washing the desired product with acetone to free it of impurities.

GUY C. TAYLOR.